United States Patent
Xia et al.

(10) Patent No.: US 6,493,399 B1
(45) Date of Patent: Dec. 10, 2002

(54) DIGITAL WIRELESS COMMUNICATIONS SYSTEMS THAT ELIMINATES INTERSYMBOL INTERFERENCE (ISI) AND MULTIPATH CANCELLATION USING A PLURALITY OF OPTIMAL AMBIGUITY RESISTANT PRECODERS

(75) Inventors: Xiang-Gen Xia, Newark, DE (US); Guangcai Zhou, Los Angeles, CA (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 09/261,294

(22) Filed: Mar. 2, 1999

Related U.S. Application Data

(60) Provisional application No. 60/076,920, filed on Mar. 5, 1998.

(51) Int. Cl.[7] .............................................. H04L 25/49
(52) U.S. Cl. ...................................... 375/296; 375/229
(58) Field of Search .............................. 375/296, 295, 375/229, 348

(56) References Cited

U.S. PATENT DOCUMENTS

| | | |
|---|---|---|
| 4,700,345 A | 10/1987 | Morcom et al. |
| 5,291,520 A | 3/1994 | Cole |
| 5,329,578 A | 7/1994 | Brennan et al. |
| 5,353,310 A | 10/1994 | Russell et al. |
| 5,400,368 A | 3/1995 | Cheng et al. |
| 5,455,839 A | 10/1995 | Eyuboglu |
| 5,479,453 A | 12/1995 | Anvari et al. |
| 5,488,633 A | 1/1996 | Laroia |
| 5,592,514 A | 1/1997 | Mobin |
| 5,606,596 A | 2/1997 | Jain et al. |
| 6,144,711 A | * 11/2000 | Raleigh et al. .......... 375/347 |

* cited by examiner

*Primary Examiner*—Stephen Chin
*Assistant Examiner*—David B. Lugo
(74) *Attorney, Agent, or Firm*—Connolly Bove Lodge & Hutz LLP

(57) ABSTRACT

A digital wireless communications system which eliminates intersymbol interference in a transmitted signal using a plurality of precoders in a transmitter thereof and a method of using the same. The digital wireless communications system includes a receiver having an antenna array for receiving transmitted digitally-encoded signals, and a transmitter for transmitting the digitally-encoded signals. The transmitter has a plurality of precoders which eliminate intersymbol interference in the transmitted signals such that the receiver recovers digital information from the transmitted signals which is free from intersymbol interference. Ambiguity resistant (AR) precoding has been recently proposed in intersymbol interference (ISI) and multipath cancellations, where the ISI/multipath channel may have frequency-selective fading characteristics and its knowledge is not necessarily known. With the AR precoding, no diversity is necessary at the receiver. In the precoding, the AR property for a precoder plays an important rule. In this paper. more families and properties of AR precoders are presented and characterized. In particular. all systematic AR precoders are characterized. More importantly, the concepts of precoder distance and optimal precoders are introduced and characterized, enabling construction of all optimal systematic AR precoders when additive channel random noise is concerned. A necessary and sufficient condition for an AR precoder to be optimal is provided which is easy to check. Numerical examples are also presented to show the improved performance over the known AR precoders in ISI cancellation applications.

8 Claims, 4 Drawing Sheets

DIGITAL WIRELESS COMMUNICATIONS SYSTEMS THAT ELIMINATES INTERSYMBOL INTERFERENCE (ISI) AND MULTIPATH CANCELLATION USING A PLURALITY OF OPTIMAL AMBIGUITY RESISTANT PRECODERS

This application claims priority under 35 USC §119(e) (1) of provisional application number 60/076,920, filed on Mar. 5, 1998.

BACKGROUND OF THE INVENTION

A. Field of the Invention

The present invention relates generally to digital wireless communication systems, and, more particularly, to a digital wireless communications system that eliminates intersymbol interference ("ISI") and mutlipath cancellation using a plurality of optimal, ambiguity resistant ("AR") precoders.

B. Description of the Related Art

Digital data signals sent from a transmitter to a receiver over a data channel are often corrupted by the inherent characteristics of the channel. For example, if the data channel has a limited bandwidth, the pulses will start to overlap, which often leads to the situation where a signal received at a specific moment not only depends upon a single data symbol, but also on data symbols adjacent in time. This is known as intersymbol interference or ISI. Intersymbol interference may be caused not only by the limited bandwidth of the channel, but also by the use of a band limiting filter at the transmitter for giving the frequency spectrum of the transmitted and recorded pulses a desired shape. The presence of intersymbol interference will thus often lead to an increased symbol error rate.

In attempting to correct for intersymbol interference, it is common to supply an equalizer in the receiver. An equalizer is a digital hardware/software apparatus which corrects for the intersymbol interference of the received digitally-encoded signals so that the initial data can be recovered. Typically, the equalizer compensates for intersymbol interference via several processes, such as linear equalization or decision feedback equalization. In linear equalization, the incoming signals are multiplied by the inverse of the intersymbol interference, generally removing intersymbol interference from the incoming signals. A drawback of linear equalization is that noise inherent in the data transmission is undesirably simultaneously amplified. Decision feedback equalization avoids the noise amplification problems of linear equalization, but runs the risk of error propagation since any decision errors that are made are fed back.

Wireless communication is well known in the art. A "wireless communications system" refers to a communications system having a transmitting end and a receiving end in which signals are transmitted or communicated from the transmitting end to the receiving end via a signal path, wherein a portion of the signal path from the transmitting end to the receiving end includes signal transmission via a wireless medium.

In digital wireless communications systems, antenna array receivers play an important role in reducing errors, such as intersymbol interference, in the digital signals received. One of the problems of a digital wireless communication system is the equalizing of the digitally-encoded signals, as noted above. As the digitally-encoded signal is transmitted from one unit to another, through a multiplicity of data paths, the various signals arriving at the other unit can cause delay spread between the digitally-encoded signals, also known as intersymbol interference.

The problem of intersymbol interference is especially true for low-power, high-speed, digital wireless communications systems, such as personal communication services (PCS). PCS is a new type of service being introduced in which subscribers are provided with a single, personal telephone number used to access those subscribers regardless of their physical location. For example, callers to a personal number may automatically be connected to a business, residence, cellular, or other phone, or voice messaging system, depending on where the individual they are trying to reach happens to be at the time of the call.

In PCS systems, however, high speed sampling at the receiver causes significant hardware cost. A proposed solution for reducing hardware costs involves providing a downsampling block in the receiver which reduces the sampling rate of the signals received at the receiver. In such sampled systems, the bandwidth of the received signals is reduced by downsampling. This involves dropping samples to reduce the number of signals received. A drawback of downsampling is that it causes information to be lost.

Another approach, as suggested by M. Tomlinson in "New Automatic Equalizer Employing Modulo Arithmetic," *Electronics Letters,* vol. 7, pp. 138-39 (March, 1971), involves eliminating intersymbol interference in the transmitter rather than in the receiver of the communications system. In other words, the signals are predistorted in the transmitter in such a manner that would cancel out the intersymbol interference of the channel upon transmission. The Tomlinson scheme precodes the signal data according to a linear function and is generally effective. However, Tomlinson precoding substantially destroys a desired power distribution of coded signals.

Intersymbol interference(ISI) and multipath fading are important problems in digital communications. Precoding is one of the techniques used for ISI/multipath cancellation. Conventional precoding techniques, such as Tomlinson-Harashima precoding and trellis preceding, and other ISI cancellation techniques, such as decision feedback equalizers, usually suffer from spectrum-null characteristics in frequency-selective fading channel. Further, conventional precoding methods require knowledge of the ISI channel at the transmitter, i.e., a feedback channel is needed.

SUMMARY OF THE INVENTION

An object of the invention is to provide a digital wireless communications system in which a system receiver is capable of recovering information received from a system transmitter without realizing the intersymbol interference channel characteristics received in an antenna array of the system receiver.

A further object of the invention is to reduce the hardware needed in and increase the capacity of a high-speed, low-power digital wireless communications system such as personal communication services (PCS).

A still further object of the present invention is to provide a digital wireless communications system in which the system receiver receives digitally-encoded data at a reduced sampling rate.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a digital wireless communications system including: a receiver having an antenna array for receiving transmitted digitally-encoded signals; and a transmitter for transmitting the digitally-encoded signals, the transmitter having a plurality of precoders which eliminate intersymbol interference in the transmitted signals such that the receiver recovers digital information from the transmitted signals which is free from intersymbol interference.

The invention further comprises a method for eliminating intersymbol interference in a digital wireless communications system comprising a receiver having an antenna array for receiving transmitted digitally-encoded signals, and a transmitter for transmitting the digitally-encoded signals, the method comprising the step of: providing the transmitter with a plurality of precoders which eliminate intersymbol interference in the transmitted signals such that the receiver recovers digital information from the transmitted signals which is free from intersymbol interference.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
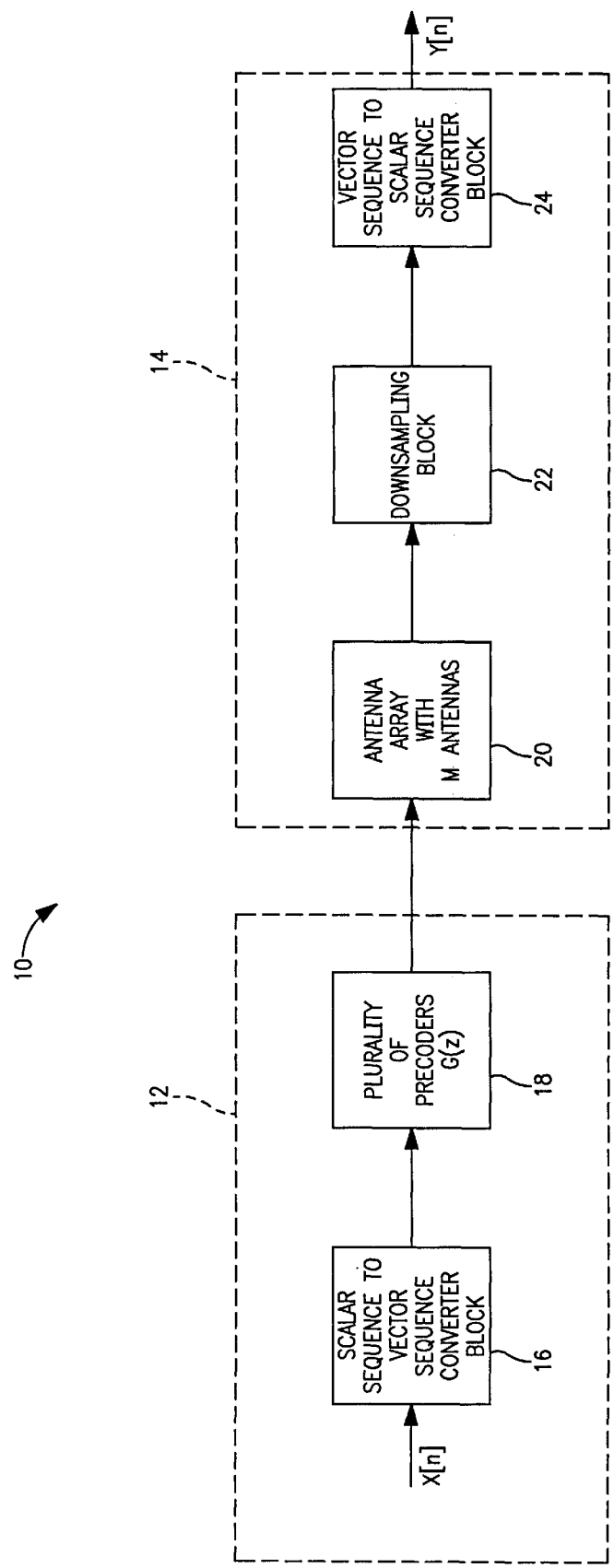
FIG. 1 is a block diagram of a digital wireless communications system in accordance with a preferred embodiment of the present invention.

In accordance with the invention, and as shown in FIG. 1, the present invention includes a digital wireless communications system 10 having a transmitter 12 and a receiver 14. Transmitter 12 generates a digitally-encoded, scalar sequence signal x[n] which is converted into a vector sequence in a scalar sequence-to-vector sequence converter block 16. The vector sequence is subsequently transmitted to a plurality of precoders 18. The precoded vector sequence is then provided to receiver 14.

Receiver 14 comprises an antenna array 20 having M antennas, which receives the precoded vector sequence. Antenna array 20 feeds the precoded vector sequence to a downsampling block 22. Downsampling block 22 reduces the sampling rate of ("downsamples") the precoded vector sequence provided to receiver 14. The downsampled, precoded vector sequence is provided by downsampling block 22 to a vector sequence-to-scalar sequence converter block 24 where it is converted back into a scalar sequence and outputted by receiver 14 as a digitally-encoded, scalar sequence signal y[n].

Each of the plurality of precoders 18 is represented by G(z), wherein G(z) is an N×K polynomial matrix of a delay variable z–1, and K<N. Each precoder G(z) expands the transmission bandwidth of the signal provided there through by (N–K)/N. As seen by this equation, the transmission bandwidth is a minimum when K=N–1. With the plurality of precoders 18 of the present invention, receiver 14 is capable of recovering information provided in transmitted signal x[n] and provide an output signal y[n] which is equal to transmitted signal x[n] without realizing the intersymbol interference inherent in transmitted signal x[n].

To ensure such information recovery, each precoder G(z) satisfies the following conditions. Given an N×N invertible constant matrix E and an K×K invertible polynomial matrix V(z), each precoder G(z) of the present invention satisfies the following equation:

$$EG(z)=G(z)V(z) \qquad (1.1)$$

The only solution for equation (1) is where E=αI and V(z)=αI, wherein a is a constant and I is the identity matrix. For purposes of definition, a matrix B is called an "inverse" of matrix A if AB=BA=I, wherein I is the identity matrix. If matrix A has an inverse, then matrix A is said to be an "invertible matrix."

Each of the plurality of precoders G(z) satisfies equation (1.1), and thus, guarantees information recovery in the downsampled antenna array receiver system shown in FIG. 1. Each precoder G(z) further satisfies the following equation:

$$G(z) = E\begin{bmatrix} G_1(z) \\ 0 \end{bmatrix} V(z) \qquad (1.2)$$

Where 0 is an (N–K–1)×K matrix with all zero components, and G(z) is a (K+1)×K matrix $$G_1(z) = \begin{bmatrix} 1 & 0 & 0 & \dots & 0 & 0 \\ z^{-Y} & 1 & 0 & \dots & 0 & 0 \\ 0 & z^{-Y} & 1 & \dots & 0 & 0 \\ . & . & . & . & . & . \\ 0 & 0 & 0 & \dots & z^{Y} & 1 \\ 0 & 0 & 0 & \dots & 0 & z^{-Y} \end{bmatrix}_{(K+1) \times K} \qquad (1.3)$$

where γ is an integer not equal to zero.

By providing the plurality of precoders G(z) satisfying the above-mentioned equations in trans,otter 12 of the present invention, the effects of intersymbol interference on the transmitted digitally-encoded signal are eliminated so that receiver 14 may effectively receive a signal free of intersymbol interference and thus downsample (reduce the sampling rate of) the received data in downsampling block 22. Therefor, the present invention reduces the need for costly hardware in the receiver and increases the capacity of a high-speed, low-powered digital wireless communications system, such as PCS.

A new precoding technique has been discovered that expands the bandwidth with minimum expense. The advantages of the new precoding technique include: when there is no other noise but the ISI, it provides an ideal linear FIR equalizer at the receiver whether or not the ISI channel has spectrum-null; it is channel independent, i.e., the feedback channel is not necessary; it is linear operation is needed); and the transmitter or receiver does not have to know the ISI channel for the equalization, i.e., blind equalization is possible.

For the blind equalization with the new precoding technique, a single receiver system does not require diversity at the receiver, and an antenna array receiver system achieves a reduced sampling rate over the baud rate, both of which are not possible for the existing blind equalization techniques without using precoding. For this purpose ambiguity resistant (AR) precoders have been introduced for combating the ambiguity induced by the ISI channel.

The present invention generally comprises AR precoders and AR precoder families having more properties than conventional precoders. More importantly, the concept of the optimal precoder is introduced, when there is additive channel random noise. The optimum precoder is achieved when the output symbols after the precoding are as far away from each other as possible in the mean square sense. This criterion is similar to the criterion used to resist random errors in communication system modulation symbol design. Given a precoder G(z) having a polynomial matrix of the delay variable $z^{-1}$, its distance is introduced by using the coefficients of its coefficient matrices. It has been found that the distance is proportional to the mean distance of the ISI channel output symbols which controls the performance by resisting additive channel random noise. Numerical examples are presented to illustrate the advantages of the present invention.

A. Ambiguity Resistant (AR) Precoders via ISI Cancellation

Figure 2:
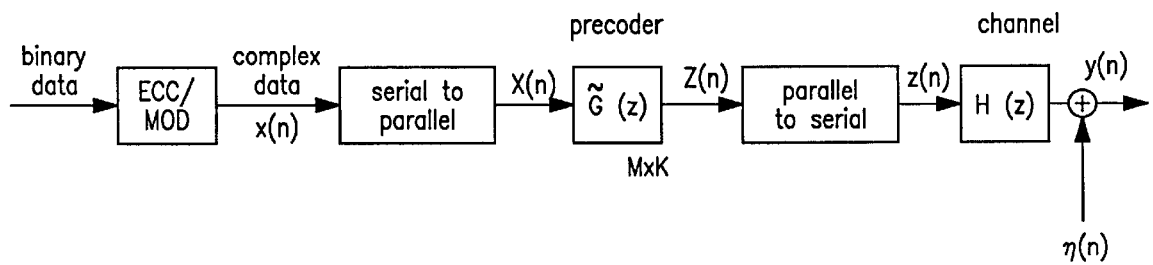
FIG. 2 is a block diagram of a precoded single receiver system in accordance with the preferred embodiment of the present invention.
Figure 3:
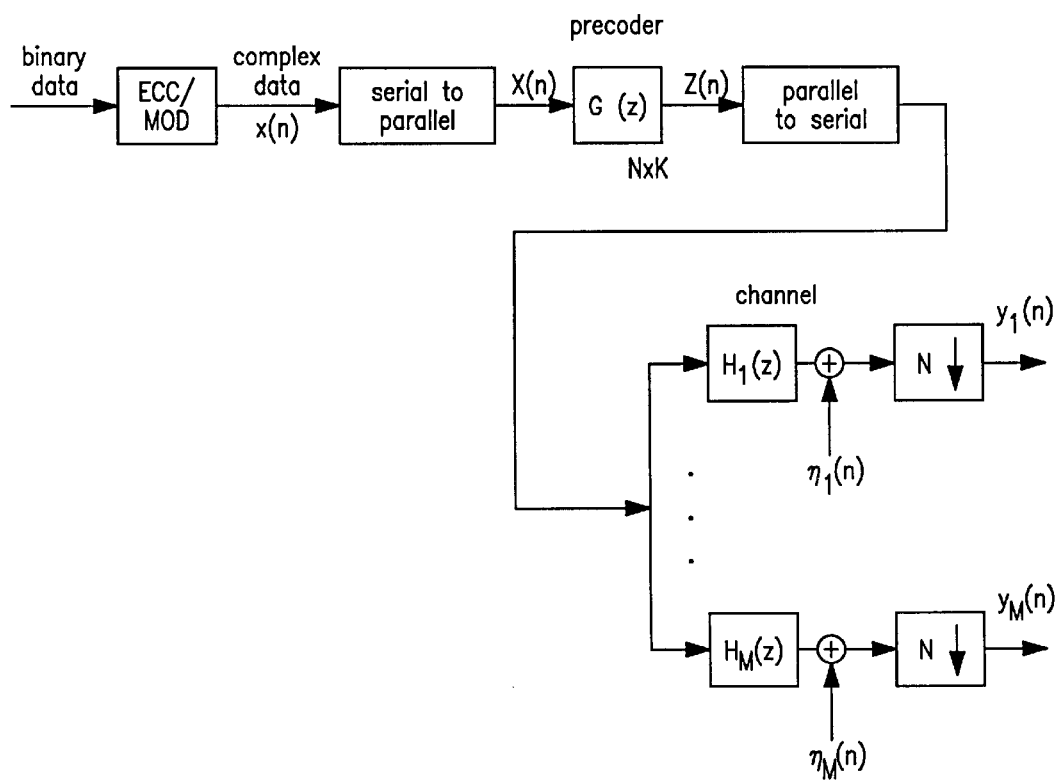
FIG. 3 is a block diagram showing an undersampled antenna array receiver system in accordance with the preferred embodiment of the present invention.

A precoded single receiver system and undersampled antenna array receiver system are shown in FIGS. 2 and 3, respectively, where $\check{G}(z)$ in FIG. 2 and G(z) in FIG. 3 are precoders, and $H(z), H_1(z), \ldots H_M(z)$ are ISI channel transfer functions and are either polynomial matrices or polynomials of the delay variable $Z^{-1}$. In the description that follows, boldface capital English letters denote polynomial matrices.

Since the two systems in FIGS. 2 and 3 can be converted to two multi-input multi-output ("MIMO") systems, existing MIMO system identification techniques can be used. However, based on MIMO system identification, one can at most identify a MIMO system to a constant matrix ambiguity. Conventional ambiguity resistant precoding is introduced to further resist the constant matrix ambiguity induced by an MIMO system identification algorithm. A precoder G(z) of size N×K is called ambiguity resistant (AR) if: (i) G(z) is irreducible, i.e., matrix G(z) has full rank for all complex values z including z=∞, and (ii) the following equation for K×K polynomial matrix V(z) has only a trivial solution V(z)=αI$_K$ for a nonzero constant α:

$$EG(z) = G(z)V(z), \quad (2.1)$$

where E is an N×N nonzero constant matrix and I$_K$ is the K×K identity matrix.

For an AR precoder G(z), the following lemma is true:
Lemma 1: If an N×K, K>1, G(z) is the AR, then:
(i) there exists no full rank constant matrix E and invertible K×K polynomial matrix V(z) such that the first column in matrix EG(z)V(z) is $(1, 0, 0, \ldots, 0)^T$; and
(ii) N>K.

Condition (ii) means that the precoding has to expand each of the K samples into N samples. Furthermore, certain redundancy is needed to resist errors, and, in a band-limited channel, a minimum bandwidth expansion is desirous. This implies that the optimal parameter K should be K=N−1, given N samples in an AR precoder.

Letting G(z) in FIG. 2 take the following form:

$$\check{G}(z) = \begin{bmatrix} I_N \\ 0_{(M-N) \times N} \end{bmatrix} G(z)$$

where M>N and G(z) is an N×K polynomial matrix. If the precoders of FIGS. 2 and 3 take the above forms and G(z) are AR, then the input signal in the systems of FIGS. 2 and 3 can be blindly identified from the output signals, where ISI channels $H(z), H_1(z), \ldots, H_M(z)$ may have spectrum-null. Linear, closed-form blind identification algorithms have also been obtained.

The following precoders G(z) having sizes N×(N−1) are AR for an integer r≧0.

$$G_1(z) = \begin{bmatrix} 1 & 0 & 0 & \ldots & 0 & 0 \\ z^{-r-l} & 1 & 0 & \ldots & 0 & 0 \\ 0 & z^{-r-l} & 1 & \ldots & 0 & 0 \\ . & . & . & . & . & . \\ . & . & . & . & . & . \\ 0 & 0 & 0 & \ldots & z^{-r-l} & 1 \\ 0 & 0 & 0 & \ldots & 0 & z^{-r-l} \end{bmatrix}_{N \times (N-1)} \quad (2.2)$$

From known AR precoders, the following lemma can be used to build more AR precoders.

Lemma 2: If an N×K polynomial matrix G(z) is AR, then polynomial matrix UG(z)W(z) is also AR for any N×N non-singular constant matrix U and any irreducible polynomial matrix W(z).

The AR precoders are generalized to polynomial ambiguity resistant ("PAR") precoders for resisting not only constant matrix ambiguities but also polynomial matrix ambiguities. The main advantage of using PAR precoders in the systems of FIGS. 2 and 3 is that the input signals can be directly identified from the output signals by resolving the channel polynomial ambiguities and without using any MIMO system identification algorithm. For simplicity, the remainder of this description focuses upon AR precoders although an analogous approach applies to PAR precoders. The family shown in equation (2.2) and Lemma 1 is the only one known so far. However, of importance is knowledge of more families of AR precoders, the criterions for justifying AR precoders, and the optimal AR precoders. The following sections are devoted to the description of these important concepts.

B. More Properties and Families of Ambiguity Resistant Precoders

In accordance with Lemma 1, every known AR precoder G(z) can be used to generate a class of AR precoders by simply left and right multiplying it with non-singular constant matrices and irreducible polynomial matrices, respectively. Clearly, the precoder in equation (2.2) generates a class of AR precoders. The question to ask is whether there exist other AR precoder classes (or families) that are not generated by the one in equation (2.2). To study this question, we introduce the concept of "equivalent classes" for AR precoders:

Definition 1: Two N×K ambiguity resistant precoders $G_1(z)$ and $G_2(z)$ are in the same "equivalent class" if and only if there exist an N×N non-singular constant matrix U and a K×K irreducible polynomial matrix W(z) such that:

$$G_2(z)=UG_1(z)W(z). \tag{3.1}$$

When precoders $G_1(z)$ and $G_2(z)$ are in the same "equivalent class," they are called "equivalent." The above equivalence is only true for the AR property. That is, if one precoder is AR and the other is AR when they are equivalent, then this does not mean the precoders have performance equivalence. Examples of this performance difference will be shown in Section D.

It is known that any polynomial matrix can be diagonalize by employing the following three elementary row and column operations:

(i) interchanging two rows (or columns), (ii) multiplying a row (or column) with a nonzero constant, or (iii) adding a polynomial multiple of a row (or column) to another row (or column).

This diagonalization is generally known as a Smith form decomposition. Any of the above elementary operations can be realized by multiplying a certain matrix by the polynomial matrix at the left or the right side. In particular, the first two operations (i) and (ii) correspond to two non-singular constant matrices, and all of the operations (i)–(iii) correspond to irreducible polynomial matrices. This means that performing row operations (i) or (ii), or any column operation of an AR precoder does not change the AR property. Thus, the following is true:

Theorem 1: Any N×K ambiguity resistant polynomial matrix G(z) is equivalent to:

$$\begin{bmatrix} g_{1,1}(z) & 0 & 0 & \ldots & 0 \\ g_{2,1}(z) & g_{2,2}(z) & 0 & \ldots & 0 \\ g_{3,1}(z) & g_{3,2}(z) & g_{3,3}(z) & \ldots & 0 \\ \cdot & \cdot & \cdot & \cdot & \cdot \\ g_{K,1}(z) & g_{K,2}(z) & g_{K,3}(z) & \ldots & g_{K,K}(z) \\ F_1(z) & F_2(z) & F_3(z) & \ldots & F_1(z) \end{bmatrix}, \tag{3.2}$$

where $F_k(z)$ are (N−K)×1 polynomial matrices, $\deg(g_{1,1}(z)) \leq \deg(g_{2,2}(z)) \leq \ldots \leq \deg(g_{K,K}(z))$, and $\deg(g_{i,j}(z)) < \deg(g_{i,i}(z))$ for any j<i and deg(f(z)) denotes the degree of polynomial f(z) of $z^{-1}$.

By doing row operations (i)–(ii) and column operations (i)–(iii), the precoder in equation (2.2) is equivalent to:

$$F(z) = \begin{bmatrix} 1 & 0 & \ldots & 0 \\ 0 & 1 & \ldots & 0 \\ \ldots & \ldots & \ldots & \ldots \\ 0 & 0 & \ldots & 0 \\ z^{-(N-1)(r+1)} & z^{-(N-2)(r+1)} & \ldots & z^{-(r+1)} \end{bmatrix}_{N \times (N-1)} \tag{3.3}$$

In this case, all diagonal elements $g_{k,k}(z)$ in equation (3.2) are equal to "1."

The diagonal matrix in the Smith form decomposition of an N×K irreducible polynomial matrix is always $$\begin{bmatrix} I_K \\ 0_{(N-K) \times K} \end{bmatrix}, \tag{3.4}$$

by using the irreducibility, where the polynomial (iii) for rows is used but may change the AR property for an AR polynomial matrix. This is why equation (3.2) is already the simplest form for an N×K AR precoder. Unlike the diagonal matrix of an AR precoder in its Smith form decomposition, the diagonal elements $g_{k,k}(z)$ in equation (3.2) are not nonzero constants and are all equal to "1." In other words, equation (3.3) may not be true in general. The following are two examples:

$$\begin{bmatrix} 1 & 0 \\ 0 & z^{-1} \\ z^{-3} & z^{-2}+1 \end{bmatrix} \begin{bmatrix} 1 & 0 \\ z^{-1} & z^{-2} \\ z^{-2} & z^{-3}+1 \end{bmatrix}, \tag{3.5}$$

which are AR but are not equivalent to the form $$\begin{bmatrix} 1 & 0 \\ 0 & 1 \\ g_{3,1}(z) & z_{3,2}(z) \end{bmatrix}$$

for any two polynomials $g_{3,1}(z)$ and $g_{3,2}(z)$ of variable $z^-$. This implies that other equivalent classes exist beyond the known ones in equations (2.2) or (3.3).

Characterizing a subclass of all AR precoders, which are equivalent to the forms in equation (3.2), with all diagonal elements being equal to "1," gives $g_{1,1}(z)=g_{2,2}(z)=\ldots=g_{K,K}(z)=1$. Due to the property $\deg(g_{i,j}(z))<\deg(g_{1,1}(z))$ for j<i in Theorem 1, equation (3.2) becomes $$\begin{bmatrix} I_K \\ F(z) \end{bmatrix}, \tag{3.6}$$

where F(z) is an (N−K)×K polynomial matrix. The precoder in equation (3.6) is called a "systematic precoder" and is analogous to systematic convolutional codes. The following Theorem characterizes all systematic AR precoders with form (3.6) when K=N−1, that is, the smallest bandwidth expansion.

Theorem 2: An N×(N 1) systematic precoder $$G(z) = \begin{bmatrix} 1 & 0 & \ldots & 0 \\ 0 & 1 & \ldots & 0 \\ \ldots & \ldots & \ldots & \ldots \\ 0 & 0 & \ldots & 1 \\ G_1(z) & G_2(z) & \ldots & G_{N-1}(z) \end{bmatrix}_{N \times (N-1)} \tag{3.7}$$

is ambiguity resistant if it is equivalent to $$F(z) = \begin{bmatrix} 1 & 0 & \ldots & 0 \\ 0 & 1 & \ldots & 0 \\ \ldots & \ldots & \ldots & \ldots \\ 0 & 0 & \ldots & 1 \\ F_1(z) & F_2(z) & \ldots & F_{N-1}(z) \end{bmatrix}_{N \times (N-1)}, \tag{3.8}$$

where $F_k(z)$ are polynomials of $z^{-1}$ such that $$\deg(F_1(z)) > \deg(F_2(z)) > \ldots > \deg(F_{N-1}(z)) \geq 1. \tag{3.9}$$

By performing constant elementary operations (i)–(iii) and general polynomial column operations (i)–(iii), G(z) in equation (3.7) is equivalent to F(z) in equation (3.8) with $\deg(F_1(z))>\deg(F_2(z))>\ldots>\deg(F_{N-1}(z))\geq 0$. Assuming deg $(F_{N-1}(z))\neq 0$, then $F_{N-1}(z)$ is a constant. This does not satisfy the necessary condition (i) in Lemma 1 for an AR precoder.

Letting $E=(e_{i,j})_{N\times N}$ and $V(z)=(v_{i,j}(z))_{N\times N}$ such that $EG(z)=G(z)V(z)$, that is, $$\begin{bmatrix} e_{11} & \cdots & e_{1N} \\ \cdots & \cdots & \cdots \\ e_{N1} & \cdots & e_{NN} \end{bmatrix} \begin{bmatrix} 1 & 0 & \cdots & 0 \\ 0 & 1 & \cdots & 0 \\ \cdots & \cdots & \cdots & \cdots \\ 0 & 0 & \cdots & 1 \\ F_1(z) & F_2(z) & \cdots & F_{N-1}(z) \end{bmatrix} =$$

$$\begin{bmatrix} 1 & 0 & \cdots & 0 \\ 0 & 1 & \cdots & 0 \\ \cdots & \cdots & \cdots & \cdots \\ 0 & 0 & \cdots & 1 \\ F_1(z) & F_2(z) & \cdots & F_{N-1}(z) \end{bmatrix} \begin{bmatrix} v_{11}(z) & \cdots & v_{1(N-1)}(z) \\ \cdots & \cdots & \cdots \\ v_{(N-1)1}(z) & \cdots & v_{(N-1)(N-1)}(z) \end{bmatrix}$$

we obtain $$e_{i,j}+e_{iN}F_j(z)=v_{i,j}(z), \text{ for } i, j=1, 2, \ldots, N-1 \quad (3.10)$$

$$e_{nj}+e_{N\,N}F_j(z)=\Sigma_{N-1,k=1}v_{kj}(z)F_k(z), \text{ for } j=1, 2, \ldots, N-1 \quad (3.11)$$

From equations (3.10) and (3.11) we obtain:

$$e_{Nj}+e_{N\,N}F_j(z)=(e_{1j}+e_{1N}F_j(z))F_1(z)+\Sigma_{N-1,k=2}(e_{kj}+e_{kN}F_j(z))F_k(z).$$

Taking j=1, gives $$e_{N1}+e_{N\,N}F_1(z)=(e_{ij}+e_{1N}F_1(z))F_1(z)+\Sigma_{N-1,\,k=2}(e_{k1}+e_{kN}F_1(z))F_k(z).$$

Comparing the coefficients of the two polynomials, provides $e_{k\,N}=0$ for any k=1, ..., N−1. Hence, $v_{ij}(z)=e_{ij}$ is in fact a constant for any i, j=1, ..., N−1. Since $\deg(F_1(z))>\deg(F_2(z))>\ldots>\deg(F_{N-1}(z))\geq 1$, wherein $F_1(z), \ldots, F_{N-1}(z)$ are linearly independent. By equation (3.1 1), we have $$e_{Nj}+e_{N\,N}F_j(z)=\Sigma_{N-1,\,k=1}v_{k\,j}F_k(z) \text{ for } j=1, 2, \ldots, N-1.$$

Hence $v_{ij}=e_{ij}=0$ or $v_{ij}=e_{ij}=e_{N\,N}$ for j=1, 2, ..., N−1. Since E is a nonzero matrix, $V(z)=\alpha I_{N-1}$ for some nonzero constant $\alpha$.

After characterizing all AR precoders with their equivalent systematic forms in equation (3.7), it is necessary to specify all different equivalent classes of equation (3.8). By doing elementary operations, precoders in equation (3.8) can be further simplified as follows.

Corollary 1: An N×(N−1) precoder G(z) in equation (3.7) is AR if it is equivalent to $$F(z) = \begin{bmatrix} 1 & 0 & \cdots & 0 \\ 0 & 1 & \cdots & 0 \\ \cdots & \cdots & \cdots & \cdots \\ 0 & 0 & \cdots & 1 \\ F_1(z) & F_2(z) & \cdots & F_{N-1}(z) \end{bmatrix}_{N\times(N-1)}, \quad (3.12)$$

where $$F_k(z)=\Sigma_{rk,\,l=1}a_{kl}z^{-nkl}, \quad k=1, 2, \ldots, N-1, \quad (3.13)$$

where $r_k>0$, and $a_{kl}\neq 0$ when $r_k>1$, $$n_{k1}>n_{k2}>\ldots>n_{kr}\geq 0, \text{ and } n_{11}>n_{21}>\ldots>n_{(N-1)1}>0, \quad (3.14)$$

and the powers in $F_k(z)$ do not include any leading power $z^{-np1}$ in $F_p(z)$ for p=k+1, ..., N−1, i.e., the integer set $\{n_{kl}: l=2, \ldots, r_k\}$ does not intersect with the integer set $\{n_{l\,1}: l=k+1, \ldots, N-1\}$ for k=1, 2, ..., N−2.

All AR precoders in equation (3.7) can be classified as follows.

Corollary 2: Two AR precoders in equation (3.7) are equivalent if they can be equivalently reduced to the same form (3. 12) in Corollary 1.

From Corollary 2, one can clearly see that there are many equivalent classes that are not the same as those shown in equations (2.2) or (3.3).

C. Optimal Ambiguity Resistant Precoders

Although all AR precoders cancel ISI without additive noise, AR precoders may have performance differences when there is additive noise in the channel. The question becomes which AR precoder is "better," where "better" means better symbol error rate performance at the receiver after equalization.

1. Distance and Criterion for AR Precoders

In conventional error control coding, inputs. code coefficients, and outputs are all in a finite field, such as "0" and "1," and the coding arithmetic is the finite field arithmetic. Thus, the "distance" concept is clear such as, for example, the Hamming distance between two finite sequences of "0s" and "1s." Moreover, the minimum distance between all coded sequences can be calculated from the code itself. The minimum distance controls the performance of the error rate at the receiver for decoded sequences when only additive random noise occurs in the channel. A hypothetical Code A is better than Code B if the minimum distance of Code A is larger than the minimum distance of Code B.

The keys for this criterion to hold is that all inputs, code coefficients, and outputs are in the same finite field and that only additive random noise is in the channel. This is not true for the preceding studied in Sections A and B, where inputs, precoder coefficients, and outputs are all in the complex-valued field and the channel has ISI besides additive random noise. Although this is the case, the "distance" of the ISI channel output values also controls the performance in resisting additive random noise. A first issue is that the conventional Hamming distance does not apply, and the Euclidean distance for the output signal values, after preceding, needs to be used. The Euclidean distance is in the mean sense when the input signal is modeled as a complex-valued random process. However, as a second issue, the Euclidean distance of the output values of the ISI channel, which determines the performance of the precoder in resisting additive random errors, needs to be determined.

Figure 4:
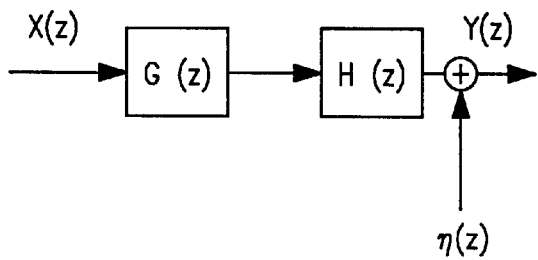
FIG. 4 is a block diagram showing a system unifying the systems of FIGS. 2 and 3 as one.

Referring to the systems with ISI as shown in FIGS. 2 and 3, by blocking the ISI channels from serial to parallel, the systems can be unified into the one shown in FIG. 4, where X(z) is the K×1 polynomial matrix of the z-transform of the input vectors, G(z) is the N×K AR precoder, H(z) is the M×N polynomial matrix of the ISI channel, η(z) is the M×1 polynomial matrix of the z-transform of the additive white noise vectors, and Y(z) is the M×1 polynomial matrix of the z-transform of the channel output vectors. Given:

$$G(z) = \sum_{n=0}^{Q_G} G(n)z^{-n}, H(z) = \sum_{n=0}^{Q_H} H(n)z^{-n},$$

$$X(z) = \sum_n X(n)z^{-n}, Y(z) = \sum_n Y(n)z^{-n},$$

where $V(z) \triangleq G(z)X(z)=\Sigma_n V(n)z^{-n}$, the z-transform of the precoder output vector sequence, and $U(z) \triangleq H(z)V(z)=\Sigma_n U(n)z^{-n}$, the z-transform of the ISI channel output vector sequence. Values X(n), Y(n), V(n) and η(n) are constant column vectors while G(n) and H(n) are constant matrices.

By concatenating vectors X(n) together, vectors V(n) together, vectors U(n) together, vectors ) η(n) together, and vectors Y(n) together, we obtain bigger block vectors X=(x(n)), V=(v(n)), U=(u(n)), η=(η(n)), and Y=(y(n)), respectively. Letting G and H denote the generalized Sylvester matrices:

$$G = \begin{bmatrix} G(Q_G) & \ldots & G(0) & \ldots & 0 \\ \ldots & \ldots & \ldots & \ldots & \\ 0 & \ldots & G(Q_G) & \ldots & G(0) \end{bmatrix}, \quad (4.1)$$

$$H = \begin{bmatrix} H(Q_G) & \ldots & H(0) & \ldots & 0 \\ \ldots & \ldots & \ldots & \ldots & \\ 0 & \ldots & H(Q_H) & \ldots & H(0) \end{bmatrix}$$

Then, V=GX, U=HV, and Y=U+η. (4.2)

For convenience it is assumed the input signal x(n) is an i.i.d. random process with a mean of zero and a variance $\sigma^2_x$. Thus, random processes v(n) and u(n) have a mean of zero. We also assume that all coefficients in the ISI channel H(z) are i.i.d., with a mean of zero and a variance of $\sigma^2_H$, and are independent of x(n). This assumption is only used to simplify the following analysis and it does not apply to the single receiver system of FIG. 2, where the corresponding channel matrix H(z) has a pseudo-circulant structure.

The mean distances between all values of u(n) and all values of v(n) are $$d_v \triangleq \left(E\left(\sum_{m,n}|v(m)-v(n)|^2\right)\right)^{1/2}, \; d_u \triangleq \left(E\left(\sum_{m,n}|u(m)-u(n)|^2\right)\right)^{1/2}, \quad (4.3)$$

respectively, where E means the expectation. By the assumptions on the coefficients of H(z), the following relationship between the mean distance $d_u$ of the ISI channel output values u(n) and the mean distance $d_u$ of the precoder output values (or the ISI channel input values) v(n), is true:

$$d_u = \sigma_H d_v, \quad (4.4)$$

This can be stated in the following lemma.

Lemma 3: The performance of a precoder in resisting additive channel white noise is proportional to the mean distance of the precoder output values.

The above result solves the second issue discussed in the beginning in this section. Thus, only the mean distance $d_v$ of all the precoder output values for the performance of resisting additive channel random errors needs to be resolved. Based upon the above analysis, we have the following definition for optimal AR precoders.

Definition 2: An N×K ambiguity resistant precoder G(z) is "optimal" if the mean distance $d_v$ of all the precoder output values is the minimal among all N×K ambiguity resistant precoders, when the total energy is fixed.

The squared mean distance $d_v$ can be calculated as:

$$d_v^2 = \quad (4.5)$$

$$\sum_{m,n} E|v(m)-v(n)|^2 = 2(LN-1)\sum_n E(|v(n)|^2) - 2\sum_{m\neq n} E(v(m)v^*(n)),$$

where L is the length of the precoder output vector sequence V(n) and N is the precoder size. Let R(m,n) be the correlation function of the random process v(n), i.e., R(m,n)=E(v(m)v·(n)). Let R be the correlation matrix of v(n), i.e., $$R=(R(m,n))=E(GX(GX)^\dagger)=GE(XX)^\dagger G^\dagger = \sigma_x^2 GG^\dagger, \quad (4.6)$$

where $^\dagger$ means the conjugate transpose. The first and second terms in the right hand side of equation (4.5) for the distance $d_v$ are the sum of all the diagonal elements, i.e., the trace of the matrix $GG^\dagger$ multiplied by two, and the sum of all the off diagonal elements of the matrix $GG^\dagger$ multiplied by $2\sigma_x^2$, respectively. The squared mean distance $d_v$ can be calculated as:

$$d_v^2 = 2\sigma_x^2\left((LN-1)trace(GG^\dagger) - \sum_{m\neq n}GG^\dagger\bigg|_{mn}\right) = \quad (4.7)$$

$$2\sigma_x^2\left(LN trace(GG^\dagger) - \sum_{m,n}(GG^\dagger)_{mn}\right),$$

where $(GG^\dagger)_{mn}$ denotes the element at the mth row and the nth column of $GG^\dagger$.

The next step is to simplify $d_v$ in equation (4.7) using all the coefficients in the precoder G(z). For a precoder G(z), define:

$D_G \triangleq$ sum of all coefficients of all coefficient matrices of $G(z)G^\dagger(1/z)$, and $^\Phi$ (4.8)

$E_G \triangleq$ sum of all magnitude squared coefficients of all coefficient matrices of G(z), (4.9)

where $G^\dagger$ means the conjugate transpose of all coefficient matrices of G(z). Letting L be the length of the precoder output vector sequence V(n), then:

$$trace(GG^\dagger)=LE_G, \text{ and } \Sigma_{m,n}(GG^\dagger)_{mn}=LD_G \quad (4.10)$$

Therefore, $$d^2_v=2\sigma_x^2 L(LNE_G-D_G). \quad (4.11)$$

Since $E_G$ is fixed as the total energy of all the coefficients of the coefficient matrices G(z), and $\sigma_x^2$, L, and N are also fixed, equation (4.11) provides the following criterion for judging the performance of an AR precoder.

Definition 3: N×K ambiguity precoder G(z) is better than N×K ambiguity resistant precoder F(z) if $D_G<D_F$ when $E_G=E_F$, where $D_G$, $D_F$, $E_G$, and $E_F$ are defined by equations (4.8) and (4.9) for precoders G(z) and F(z), respectively.

Based on equation (4.1 1), the distance for a precoder is defined as follows.

Definition 4: For an N×K precoder G(z), its distance is defined by $d(G) \triangleq N-D_G/E_G$, where $D_G$ and $E_G$ are defined in equations (4.8) and (4.9).

With Definitions 3 and 4, the following corollary is true.

Corollary 3: AR precoder G(z) is better than AR precoder F(z) if the distance of G(z) is greater than the distance of F(z), i.e., d(G)>d(F).

Using two examples, consider the two AR precoders G(z) in equation (2.2) and F(z) in equation (3.3) such that $E_G=E_F=2(N-1)$, and when N>2, $$G(z)G^\dagger(1/z) = \begin{bmatrix} 1 & z^{r+1} & 0 & \ldots & 0 & 0 & 0 \\ z^{-r-1} & 2 & z^{r+1} & \ldots & 0 & 0 & 0 \\ \ldots & \ldots & \ldots & \ldots & \ldots & \ldots & \ldots \\ 0 & 0 & 0 & \ldots & z^{-r-1} & 2 & z^{r+1} \\ 0 & 0 & 0 & \ldots & 0 & z^{-r-1} & 1 \end{bmatrix}_{N\times N}$$

and

-continued $$F(z)F^\dagger(1/z) = \begin{bmatrix} 1 & 0 & \cdots & 0 & z^{-(N-1)(r+1)} \\ 0 & 1 & \cdots & 0 & z^{-(N-2)(r+1)} \\ \cdots & \cdots & \cdots & \cdots & \cdots \\ 0 & 0 & \cdots & 1 & z^{r+1} \\ z^{-(N-1)(r+1)} & z^{-(N-2)(r+1)} & \cdots & z^{-(r+1)} & N-1 \end{bmatrix}_{N \times N}$$

Thus, when $N>2$, $D_G=D_F=4(N-1)$. Therefore, when $N<2$, $$d(G) = d(F) = N - \frac{4(N-1)}{2(N-1)} = N-2$$

This proves the following corollary.

Corollary 4: The AR precoders, F(z) in equation (3.3) and G(z) in equation (2.2) have distances $d(F)=N-3/2$ and $d(G)=N-2$, respectively, when $N>2$. When $N=2$, $d(G)=d(F)=0$. In other words, these two precoders are equivalent not only with respect to the AR property but also with respect to the distance property.

This corollary is best seen by the numerical examples provided in the next Section, where QPSK is used for the input signals and there is only a small performance difference between these two precoders. This small performance difference is caused by the specific QPSK.

Since the precoder output vector length L, the precoder size N, and the input signal variance are fixed, the following theorem is straightforward from equation (4.11).

Theorem 3: An N×K ambiguity resistant precoder G(z) is optimal in all N×K ambiguity resistant precoders if the total sum $D_G$ of all the coefficients of all the coefficient matrices of the product matrix $G(z)G^\dagger(1/z)$ is minimal among all possible N×A ambiguity resistant precoders F(z) when the total sum $E_G$ of all the magnitude squared coefficients of all coefficient matrices of F(z) is fixed.

We now want to find a family of column operations of a precoder that do not change the distance property. A K×K polynomial matrix U(z) is called paraunitary if $U(z)U^\dagger(1/z)=I_K$. With paraunitary polynomial matrices, we have the following result.

Corollary 5: Let U(z) be a K×K paraunitary matrix. If G(z) is an N×K AR precoder with distance d(G), then G(z)U(z) is also an AR precoder with distance d(G), i.e., d(GU)=d(G). If G(z) is an optimal N×K AR precoder, then so is G(z)U(z).

From equation (4.8), clearly $D_G=D_{GU}$. Since the sum of all magnitude squared coefficients of all coefficient matrices of G(z) is equal to the sum of all diagonal elements of the coefficient matrix of the constant term $z^{-0}$ in the matrix $G(z)G^\dagger(1/z)$ and $G(z)U(z)U^\dagger(1/z)G^\dagger(1/z)=G(z)G^\dagger(1/z)$, we have $E_G=E_{CU}$. Thus, by Definition 4, we have d(G)=d(GU), and $$\sigma_x^2 L D_G = \sigma^2 \sum_{x,m,n} (GG^\dagger)_{mn} = \sum_{m,n} E(v(m)v*(n)) = E\left|\sum_n v(n)\right|^2 \geq 0. \quad (4.12)$$

Using equation (4.11), the following upper bound for the mean distance $d_v$, is proved.

Theorem 4: The mean distance $d_v$ of the precoder output values for an N×K precoder G(z) is upper bounded by:

$$d_v \leq \sigma_x L \sqrt{2N} \sqrt{E_G}, \quad (4.13)$$

where $\sigma_x^2$ is the input signal variance, L is the length of the precoder output vector sequence, and $E_G$ is defined by equation (4.9), i.e., the total energy of all coefficients in G(z). The upper bound for the distance of an N×K precoder G(z) is $d(G) \leq N$.

The precoders that reach the upper bound in equation (4.13) are optimal. When there is no precoding, i.e., $G(z)=I_N$, then $$E\left|\sum_n v(n)\right|^2 = \sum_n E|v(n)|^2 = \sum_n E|x(n)|^2 = LN\sigma_x^2 > 0,$$

$$E|\Sigma_n v(n)|^2 = \Sigma_n E|v(n)|^2 = \Sigma_n E|x(n)|^2 = LN\sigma_x^2 > 0,$$

$$d_v = \left(\sum_{m,n} E|v(m) - v(n)|^2\right)^{1/2} = \sigma_x \sqrt{2(LN-1)LN}$$

the mean distance of the precoder output value is $$d_v = (\Sigma_{m,n} E|v(m)-v(n)|^2)^{1/2} = \sigma_x \sqrt{2(LN-1)LN}$$

and the precoder distance is d(G)=0 in this case, i.e., nothing is gained.

2. Optimal Systematic AR Precoders

Determination of optimal systematic AR precoders requires using the criterion discussed in Section C.1. Therefore, the following is true.

Theorem 5: An N×(N−1) systematic, ambiguity resistant precoder F(z) having $$F_k(z) = \sum_{l=0}^{n_k} a_{kl} z^{-l}, \; a_{kn_k} \neq 0, \quad (4.14)$$

$$1 \leq k \leq N-1, n_1 > n_2 > \ldots > n_{N-1} \geq 1,$$

is optimal if $$\sum_{l=0}^{n_k} a_{kl} = -1. \; \text{for } k=1, 2, \ldots, N-1.$$

Moreover, for the above optimal precoder, the mean distance $d_v$ of the precoder output values and the precoder distance d(F) are $$d_v \leq \sigma_x L \sqrt{2N} \sqrt{E_F}, \text{ and } d(F)N, \quad (4.16)$$

where $\sigma_x^2$ is the variance of the input signal, L is the length of the precoder output vector sequence and $$E_F = N - 1 + \sum_{k=1}^{N-1} \sum_{l=0}^{n_k} |a_{kl}|^2. \quad (4.17)$$

By equation (4.9). $E_F$ is the total sum of all the coefficients in all coefficient matrices of the precoder F(z). To calculate $D_F$ in equation (4.8) for F(z), the product matrix $F(z)F^\dagger(1/z)$ is $$F(z)F^\dagger(1/z) = \begin{bmatrix} 1 & 0 & \ldots & 0 & F*_1(1/z) \\ 0 & 1 & \ldots & 0 & F*_2(1/z) \\ \ldots & \ldots & \ldots & \ldots & \ldots \\ 0 & 0 & \ldots & 1 & F*_{N-1}(1/z) \\ F_1(z) & F_2(z) & \ldots & F_{N-1}(z) & F_0(z) \end{bmatrix}_{N \times N},$$

where $$F*_k(1/z) = \sum_{l=0}^{N-1} a*_{kl} z^l,$$

and $$F_0(z) = \sum_{k=1}^{N-1} F_k(z) F*_k(1/z) = \sum_{k=1}^{N-1} \sum_{l_1=0}^{n_k} \sum_{l_2=0}^{n_k} a_{kl} a*_{kl} z^{-(l_1-l_2)}$$

Thus, $$D_F =$$

$$N - 1 + \sum_{k=1}^{N-1} \sum_{l=0}^{n_k} (a_{kl} + a*_{kl}) + \sum_{k=1}^{N-1} \sum_{l_1=0}^{n_k} \sum_{l_2=0}^{n_k} a_{kl} a*_{kl} = \sum_{k=1}^{N-1} \left| \sum_{l=0}^{n_k} a_{kl} + 1 \right|^2.$$

Therefore, the minimum of $D_F$ over all $F(z)$ in equation (4.14) is reached if $D_F = 0$. In other words, $D_F$ is minimal if equation (4.15) holds true, where $E_F$ in equation (4.17) is fixed.

When $D_F = 0$, i.e., the precoder $F(z)$ is optimal, the optimal mean distance found in equation (4.16) for the precoder $F(z)$ follows from equation (4.11). Theorem 5 also implies that there exist AR precoders that reach the upper bound found in equation (4.13), i.e., $D_g = 0$. By equation (4.12), the following corollary is straightforward.

Corollary 6: The following statements are equivalent:
  (i) An N×K AR precoder $G(z)$ is optimal;
  (ii) $D_G = 0$ i.e., the total sum of all coefficients of all coefficient matrices of $G(z)G^\dagger(z)$ is zero; and
  (iii) The distance of the precoder $G(z)$ is $d(G)=N$.

By the above results and Corollary 4, precoders $G(z)$ in equation (2.2) and $F(z)$ in equation (3.3) are not optimal.

Given size N, the simplest optimal N×(N−1) systematic AR precoders are $$\begin{bmatrix} 1 & 0 & \ldots & 0 \\ 0 & 1 & \ldots & 0 \\ \ldots & \ldots & \ldots & \ldots \\ 0 & 0 & \ldots & 1 \\ -z^{-n_1} & -z^{-n_2} & \ldots & -z^{-n_3} \end{bmatrix}_{N \times (N-1)} \quad (4.18)$$

D. Numerical Examples

Presented in this section are some examples to illustrate the theory obtained in the previous sections. Since all numerical simulations in this section are used to prove the precoders resist additive channel random errors, some simplifications are made, such as assuming that a MIMO system identification algorithm has been implemented, i.e., there is only a non-singular constant matrix ambiguity in the ISI channel.

Figure 5A:
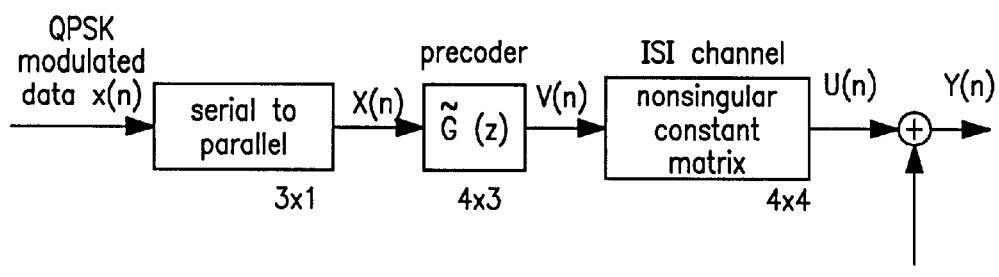
FIGS. 5(a) and 5(b) are block diagrams showing a simplified undersampled antenna receiver system in accordance with the preferred embodiment of the present invention.
Figure 5B:
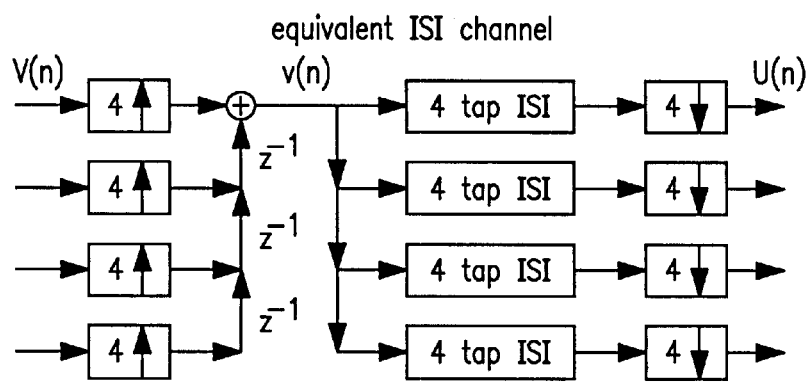

Consider the undersampled communication system shown in FIG. 3 with 5 antennas, and down sampling by a factor of four. After implementing a MIMO system identification algorithm, the ISI channel matrix becomes a 4×4 non-singular constant matrix. Thus, assume the ISI channel matrix is a 4×4 non-singular constant matrix having white noise $\eta(n)$ added to the ISI channel output, as shown in FIG. 5(a). The 4×4 ISI channel constant matrix corresponds four antenna array receivers, where each channel has a four tap ISI, using the conventional interpretation of the combination of the polyphase components, as shown in FIG. 5(b).

Next consider the following five 4×3 AR precoders:

$$G_1(z) = \begin{bmatrix} 1 & 0 & 0 \\ z^{-1} & 1 & 0 \\ 0 & z^{-1} & 1 \\ 0 & 0 & z^{-1} \end{bmatrix}, \quad G_2(z) = \begin{bmatrix} 1 & 0 & 0 \\ 0 & 1 & 0 \\ 0 & 0 & 1 \\ z^{-3} & z^{-2} & z^{-1} \end{bmatrix},$$

$$G_3(z) = \begin{bmatrix} 1 & 0 & 0 \\ 0 & 1 & 0 \\ 0 & 0 & 1 \\ \frac{1}{\sqrt{2}}(z^{-3}+z^{-2}) & \frac{1}{\sqrt{2}}(z^{-2}+z^{-1}) & \frac{1}{\sqrt{2}}(z^{-1}+1) \end{bmatrix}$$

$$G_4(z) = \begin{bmatrix} 1 & 0 & 0 \\ 0 & 1 & 0 \\ 0 & 0 & 1 \\ z^{-3} & z^{-2} & z^{-1} \end{bmatrix},$$

$$G_5(z) = \begin{bmatrix} 1 & 0 & 0 \\ 0 & 1 & 0 \\ 0 & 0 & 1 \\ az^{-3}+bz^{-2} & cz^{-2}+dz^{-1} & -z^{-1} \end{bmatrix}$$

where $$a = -\frac{\sqrt{3}+3}{4}, \quad b = \frac{\sqrt{3}-1}{4}, \quad c = \frac{\sqrt{3}+1}{4}, \quad d = \frac{\sqrt{3}-3}{4}.$$

By Corollary 2, they are all in the same equivalent class. By Theorem 5, the precoders $G_4(z)$ and $G_5(z)$ are optimal. All $E_{Gi}=6$ for i=1, 2, ... , 5 for all these precoders, and their distances are $d(G_1)=d(G_2)=4-2=2$, by Corollary 4, and $d(G_4)=d(G_5)=4$, by Theorem 5, and $$d(G_3) = 4 - \frac{3(\sqrt{2}+1)^2}{6} = \frac{5-2\sqrt{2}}{2} \approx 1.0858.$$

Figure 6:
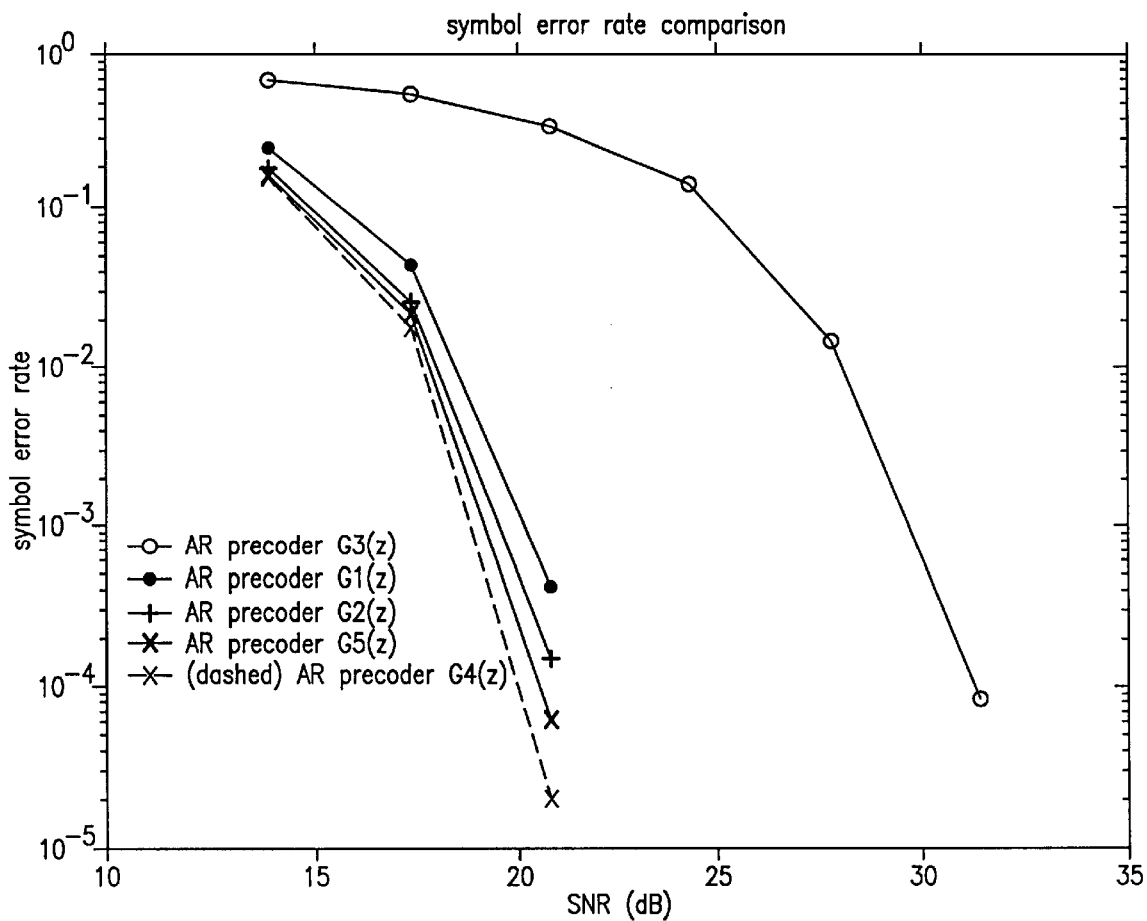
FIG. 6 is a graph showing a symbol error rate comparison of five precoders in accordance with the preferred embodiment of the present invention.

QPSK modulation is used for the input signal of the precoder. A linear closed-form equalization algorithm is used for the decoding, and three hundred Monte Carlo iterations are used. FIG. 6 shows the QPSK symbol error rate comparison of these five precoders, via the SNR for the additive channel white noise. The two optimal precoders $G_4(z)$ and $G_5(z)$ outperform the other non-optimal precoders $G^1(z)$–$G_3(z)$. Since $d(G_1)=d(G_2)$, theoretically these two precoders should have the same symbol error rate performance. As shown in FIG. 6, the performance difference between these two precoders is small. The small difference is due solely to the specific QPSK modulation. The theoretical result obtained in Section C holds true for general modulation schemes.

Thus, the present invention provides more families and properties of ambiguity resistant (AR) precoders for ISI/multipath cancellation, introduces the concept of "equivalent classes" for AR precoders, and characterizes all N×(N−1) systematic AR precoders.

More importantly, the concepts of precoder distance and optimal AR precoders were disclosed, justifying AR precoders. As shown above, given an N×K precoder G(z), its distance is defined by d(G)=N−D$_G$/E$_G$, where D$_G$ is the total sum of all coefficients of all coefficient matrices of the matrix G(z)G$^†$(1/z) and E$_G$ is the total sum of all magnitude squared coefficients of all coefficient matrices of the matrix G(z). With this distance, an N×K AR precoder is optimal if its distance is N. Furthermore, all N×(N−1) optimal systematic AR precoders were characterized, enabling construction of all possible optimal N×(N−1) systematic AR precoders. Finally, numerical examples illustrated the theory and the concepts and showed that an optimal AR precoder resists both the channel ISI and additive random noise.

The preceding disclosed herein is performed after completion of the symbol modulation. That is, the input signal of the precoding is complex-valued. Thus, the present invention comprises a combination of modulation first, followed by coding. In contrast, the traditional trellis coded modulation (TCM) comprises a combination of coding first, followed by modulation. Since the TCM coding (in finite field) takes place before the modulation (in the complex valued field), it is not easy to incorporate with the consideration of the channel ISI (in the complex valued field) cancellation. Thus, the present invention suggests a new approach called modulated precoding (MPC) which resists both the ISI and the additive random noise. Both MPC and TCM do not require knowledge of the ISI channel characteristics, if no additional ISI cancellation methods are used. Two clear advantages of MPC over TCM are: (1) the ISI cancellation capability because the precoding is designed for canceling the ISI; and (2) the possibility of closed-form linear decoding algorithms, i.e., fast algorithms. The for this is that the same complex-valued field for all input and output signals and arithmetic are used in the MPC of the present invention, rather than the combination of a finite field and the complex-valued field used in TCM.

The present disclosure has not considered a specific modulation scheme, however, the present invention is feasible with different modulation schemes. The theory developed in the present invention holds true for a general modulation scheme. Thus, optimally combining the modulation and the preceding in the MPC similar to that used in TCM is within the scope of the present invention.

It will be apparent to those skilled in the art that various modifications and variations can be made in the digital wireless communications system of the present invention and in construction of this system without departing from the scope or spirit of the invention. As an example, the present invention has been shown to be effective for high-speed, low-power digital wireless communications systems such as PCS.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A digital wireless communications system comprising:

a receiver having an antenna array for receiving transmitted digitally-encoded signals; and a transmitter for transmitting the digitally-encoded signals, the transmitter having a plurality of precoders (G(z)) which eliminate intersymbol interference in the transmitted signals such that the receiver recovers digital information from the transmitted signals which is free from intersymbol interference, wherein each of the plurality of precoders (G(z)) comprises an N×K polynomial matrix of a delay variable z$^{-1}$, and K<N.

2. A method for eliminating intersymbol interference in a digital wireless communications system comprising a receiver having an antenna array for receiving transmitted digitally-encoded signals, and a transmitter for transmitting the digitally-encoded signals, the method comprising the step of:

providing the transmitter with a plurality of precoders (G(z)) which eliminate intersymbol interference in the transmitted signals such that the receiver recovers digital information from the transmitted signals which is free from intersymbol interference, wherein each of the plurality of precoders (G(z)) comprises an N×K polynomial matrix of a delay variable z$^{-1}$, and K<N.

3. A digital wireless communications system as recited in claim 1, wherein each of the plurality of precoders (G(z)) expands transmission bandwidths of the transmitted signals provided therethrough by (N−K)/N.

4. A digital wireless communications system as recited in claim 1, wherein given an N×N invertible constant matrix (E) and a K×K invertible polynomial matrix (V(z)), each of the plurality of precoders (G(z)) satisfies the following equation: EG(z)=G(z)V(z).

5. A digital wireless communications system as recited in claim 4, wherein each of the plurality of precoders (G(z)) further satisfies the following equation:

$$G(z) = E\begin{bmatrix} G_1(z) \\ 0 \end{bmatrix} V(z),$$

where 0 is an (N−K−1)×K matrix with all zero components, and G$_1$(z) is a (K+1)×K matrix satisfying the following equation:

$$G_1(z) = \begin{bmatrix} 1 & 0 & 0 & \ldots & 0 & 0 \\ z^{-\gamma} & 1 & 0 & \ldots & 0 & 0 \\ 0 & z^{-\gamma} & 1 & \ldots & 0 & 0 \\ \ldots & \ldots & \ldots & \ldots & \ldots & \ldots \\ 0 & 0 & 0 & \ldots & z^{-\gamma} & 1 \\ 0 & 0 & 0 & \ldots & 0 & z^{-\gamma} \end{bmatrix}_{(K-1)\times K},$$

where γ is an integer not equal to zero.

6. A method for eliminating intersymbol interference in a digital wireless communications system as recited in claim 2, wherein each of the plurality of precoders (G(z)) expands transmission bandwidths of the transmitted signals provided therethrough by (N−K)/N.

7. A method for eliminating intersymbol interference in a digital wireless communications system as recited in claim 2, wherein given an N×N invertible constant matrix (E) and a K×K invertible polynomial matrix (V(z)), each of the plurality of precoders (G(z)) satisfies the following equation: EG(z)=(z)V(z).

8. A method for eliminating intersymbol interference in a digital wireless communications system as recited in claim 7, wherein each of the plurality of precoders (G(z)) further satisfies the following equation:

$$G(z) = E \begin{bmatrix} G_1(z) \\ 0 \end{bmatrix} V(z),$$

where 0 is an (N−K−1)×K matrix with all zero components, and $G_1(z)$ is a (K+1)×K matrix satisfying the following equation:

$$G_1(z) = \begin{bmatrix} 1 & 0 & 0 & \ldots & 0 & 0 \\ z^{-\gamma} & 1 & 0 & \ldots & 0 & 0 \\ 0 & z^{-\gamma} & 1 & \ldots & 0 & 0 \\ \ldots & \ldots & \ldots & \ldots & \ldots & \ldots \\ 0 & 0 & 0 & \ldots & z^{-\gamma} & 1 \\ 0 & 0 & 0 & \ldots & 0 & z^{-\gamma} \end{bmatrix}_{(K-1) \times K},$$

where γ is an integer not equal to zero.

* * * * *

UNITED STATES PATENT AND TRADEMARK OFFICE
CERTIFICATE OF CORRECTION

PATENT NO. : 6,493,399 B1
DATED : December 10, 2002
INVENTOR(S) : Xiang-Gen Xia et al.

It is certified that error appears in the above-identified patent and that said Letters Patent is hereby corrected as shown below:

Column 18,
Line 67, the language "EG(z)=(z)V(z)" should be deleted and replaced with the following: -- EG(z)=G(z)V(z) --.

Signed and Sealed this

Eighteenth Day of March, 2003

JAMES E. ROGAN
*Director of the United States Patent and Trademark Office*